United States Patent [19]
Kharas et al.

[11] Patent Number: 5,977,012
[45] Date of Patent: Nov. 2, 1999

[54] ALLOYED METAL CATALYSTS FOR THE REDUCTION OF $NO_X$ IN THE EXHAUST GASES FROM INTERNAL COMBUSTION ENGINES CONTAINING EXCESS OXYGEN

[75] Inventors: Karl C. C. Kharas; Heinz J. Robota; John G. Nunan; Michael G. Henk, all of Tulsa, Okla.

[73] Assignee: ASEC Manufacturing General Partnership, Tulsa, Okla.

[21] Appl. No.: 09/092,680

[22] Filed: Jun. 5, 1998

Related U.S. Application Data

[63] Continuation of application No. 08/657,061, May 28, 1996, abandoned, which is a continuation of application No. 08/252,100, Jun. 1, 1994, abandoned.

[51] Int. Cl.[6] ............................................. B01J 23/40
[52] U.S. Cl. ..................... 502/326; 502/325; 502/327; 502/332; 502/344
[58] Field of Search .................... 502/325, 326, 502/327, 332, 344

[56] References Cited

U.S. PATENT DOCUMENTS

| | | | |
|---|---|---|---|
| 4,171,287 | 10/1979 | Keith | 252/462 |
| 4,425,261 | 1/1984 | Stenius et al. | 502/339 |
| 4,440,874 | 4/1984 | Thompson | 502/327 |
| 4,657,888 | 4/1987 | Mesters et al. | 502/331 |
| 5,147,841 | 9/1992 | Wilcoxon | 502/173 |
| 5,525,570 | 6/1996 | Chakraborty et al. | 502/326 |
| 5,559,065 | 9/1996 | Lauth et al. | 502/5 |
| 5,643,850 | 7/1997 | Chakraborty et al. | 502/326 |

*Primary Examiner*—Walter D. Griffin
*Assistant Examiner*—Nadine Preisch
*Attorney, Agent, or Firm*—Kuffner & Associates

[57] ABSTRACT

Removal of carbon monoxide, hydrocarbons, and nitrogen oxides from the exhaust gas from lean-burn, diesel and other engines which produce exhaust gases containing oxygen in substantial excess of stoichiometric is provided by catalysts containing platinum alloyed with cobalt, nickel, copper, rhodium, palladium, silver or gold. Alloying is accomplished by thermal treatment or by colloidal methods. The catalysts are capable of reducing nitrogen oxides ($NO_x$) within a predetermined range of engine operating temperatures.

4 Claims, 3 Drawing Sheets

ALLOYED METAL CATALYSTS FOR THE REDUCTION OF NO$_x$ IN THE EXHAUST GASES FROM INTERNAL COMBUSTION ENGINES CONTAINING EXCESS OXYGEN

This application is a continuation of application Ser. No. 08/657,061, filed May 28, 1996, now abandoned, which in turn is a continuation of application Ser. No. 08/252,100, filed Jun. 1, 1994, now abandoned.

BACKGROUND OF THE INVENTION

The invention relates generally to the control of hydrocarbons (HC), carbon monoxide (CO), and nitrogen oxides (NO$_x$) in the exhaust of internal combustion engines. More particularly, the invention relates to the removal of NO$_x$ when the exhaust gases include oxygen substantially in excess of that needed for combustion of the fuel. This is typically the case with lean-burn engines, diesel engines, and other engines currently under development.

In recent years three-way catalysts have been used to remove all of the three principal noxious components in auto exhaust gases. The engines are run with stoichiometric air/fuel ratios and the catalysts are able to remove all three components at the same time, that is, a single catalyst is sufficient over the range of engine operating temperatures. More recently, development of so-called "lean-burn" engines is being driven by the desire to improve fuel economy. However, such engines operate with air-fuel ratios which are far from the typical stoichiometric conditions. Instead of an air-fuel ratio of about 14.55/1 by weight, the lean-burn engine may operate with air-fuel ratios above 18/1, up to about 22–24/1, or even higher ratios of 28–30/1 for advanced lean-burn engines or diesel engines. Under such conditions the engine exhaust will include more hydrocarbons, less carbon monoxide, and less, but still excessive nitrogen oxides. While an oxidation catalyst is capable of removing hydrocarbons and carbon monoxide, since the oxygen content is high, say about 3–10% by volume, it is clear that conditions are not favorable for the reduction of nitrogen oxides. Conventional gasoline engines that operate near the stoichiometric point can experience lean transients where the air-fuel ratio reaches about 15/1. Under these conditions, the chemical equivalence ratio, defined as the sum of oxidizing chemical equivalents divided by the sum of reducing chemical equivalents, of emissions from the engine can reach a value of about 2. (At the stoichiometric point the equivalence ratio is 1.0.) The present inventors are concerned with nitrogen oxide reduction from lean-burn and diesel engines where the chemical equivalence ratio is greater than 3, often greater than 5, and frequently greater than 10.

There are two generally recognized routes to removing nitrogen oxides. First, the nitrogen oxides can be decomposed to the diatomic nitrogen and diatomic oxygen. This reaction is thermodynamically favored, but catalysts which are able to carry out this reaction under the highly oxidizing conditions and high temperatures found in engine exhaust have not yet been found. The second route is the chemical reduction of nitrogen oxides using reducing agents present in the exhaust, such as carbon monoxide, hydrocarbons, and hydrogen. This is considered to be the mechanism of the three-way catalyst. However, such catalysts see the exhaust from an engine operating with a stoichiometric air-fuel ratio which contains little oxygen. When a large excess of oxygen is present, as in a lean-burn or diesel engine, the oxygen, being much greater in volume than the nitrogen oxides would be expected to react with the hydrocarbons, carbon monoxide, and hydrogen, thus removing the reducing agents needed to reduce nitrogen oxides.

In commonly-assigned U.S. Ser. No. 07/990,216 a sequence of catalysts was used to cover the range of operating temperatures experienced with internal combustion engines. The second and third catalysts in the sequence were examples of catalysts of the present invention.

SUMMARY OF THE INVENTION

In one aspect, the invention is a catalyst which is capable of removing carbon monoxide, hydrocarbons, and nitrogen oxides from the exhaust gases produced by an engine which is operated with a substantial excess of air relative to that required for stoichiometric combustion of the fuel, such as lean-burn, diesel, and the like. The catalysts of the invention employ alloys of platinum with cobalt, nickel copper, rhodium, palladium, silver, or gold dispersed on an inert support. The preferred alloys are platinum and rhodium, platinum and silver, platinum and cobalt, and platinum and palladium. Ternary alloys containing platinum, rhodium, and a third metal chosen from the group consisting of cobalt, palladium and nickel also are useful. The atomic ratios of platinum to silver may vary from about 1/10 to 1000/1. The atomic ratios of platinum to rhodium or palladium may vary from about 1/2 to 1000/1. The atomic ratio of platinum to cobalt, nickel, or copper may vary from about 1/1 to about 1000/1. The atomic ratio of platinum to gold may vary from about 15/1 to about 1000/1.

Base metals may be included as stabilizers or promoters, provided that they do not adversely affect the alloying of platinum and the other metals.

The alloying process may involve treatment of an impregnated support in an inert atmosphere containing up to about 30% steam and up to 100% hydrogen at temperatures of about 600° to 1200° C. Oxygen is typically excluded but may be present when hydrogen is absent and when it does not interfere with the desired metal alloying. Supports stable under such conditions include barium-stabilized alumina, α-alumina, δ-alumina, θ-alumina, zirconia, titania, silicon carbide, and cordierite.

When the metal to be alloyed with platinum is cobalt, nickel, copper, palladium, rhodium, silver, or gold on a temperature stable support, the metals, after being deposited on the support, are exposed to an inert atmosphere containing 0–30 vol. % steam, greater than zero up to 100 vol. % hydrogen, and zero up to less than 100 vol. % inert gas at temperatures in the range of about 600° to 1200° C.

When the metal to be alloyed with platinum is palladium, rhodium, or gold, hydrogen may be omitted and up to 21 vol. % oxygen included. The temperature is selected so that the metal to be alloyed with platinum is favored rather than the metal oxide, for example, a temperature at which Rh$_2$O$_3$ is unstable with respect to rhodium metal.

Alloyed catalysts also may be prepared by applying colloidal suspensions of alloys to a support, which may be selected from the stable supports mentioned above or alternatively other less stable supports including γ-alumina, crystalline boehmite, crystalline alumina silicates, non-crystalline silica-alumina, α-Zr(HPO$_4$)$_2$, NaZr$_2$(PO$_4$)$_3$, and (Na,H)Zr$_2$(PO$_4$)$_3$. In this process, the alloys are formed in solution or in suspension and applied to the support by adsorption; the high temperature treatment described above is not required.

DESCRIPTION OF THE PREFERRED EMBODIMENTS

Figure 1:
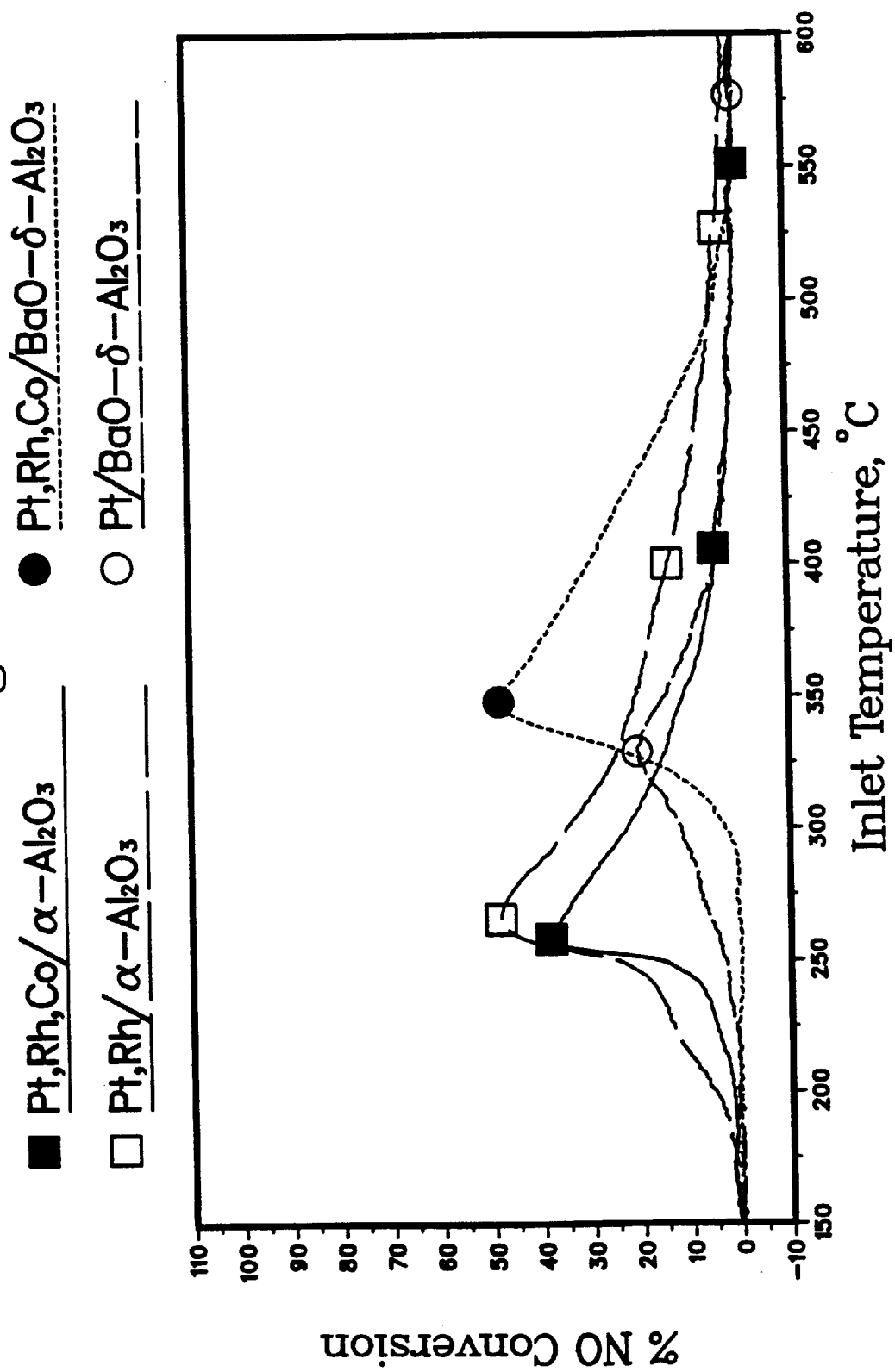
FIG. 1 is a plot of NO conversion versus temperature for catalysts tested in Example 3.

Those working in this field intend to either decompose nitrogen oxides into the elements directly or to reduce them selectively using reducing agents under oxidizing conditions. The catalysts and catalyst systems of the present invention are considered to function by reducing the nitrogen oxides rather than decomposing them. However, that conclusion was reached based on experimental evidence and is not an essential aspect of the invention. The reaction mechanisms by which nitrogen oxides are reduced are believed to vary depending on the catalyst and the operating temperatures.

It has been discovered that catalysts may function differently depending upon the operating conditions and that each catalyst has a temperature range within which it is capable of destroying nitrogen oxides. We will refer to this temperature range as a "window" within which nitrogen oxides are reduced. This is generally contrary to the experience with three-way catalysts which become active ("light-off") at a temperature of about 200° to 350° C. and thereafter are able to oxidize hydrocarbons and carbon monoxide while reducing nitrogen oxides over the usual range of operating temperatures, say about 300° to 800° C. It should be noted here that auto exhaust composition and temperature vary as driving conditions change. Consequently, tests of auto exhaust catalysts require that a car be operated over a range of conditions representing typical driving. Once three-way catalysts have reached operating temperature the performance is not greatly affected by the exhaust gas temperature. This is not the case with catalysts for engines operating in the lean-burn mode, where catalysts have a temperature range within which they are effective to remove nitrogen oxides, but not outside that range. As will be appreciated, such a characteristic is not compatible with the usual variation in engine exhaust temperatures. However, by proper selection of catalysts and their pretreatment, it is possible to remove nitrogen oxides from temperatures of about 200° to 700° C.

Selection of catalysts for this difficult task requires consideration of the characteristics of each catalyst. It is believed that the chemical reactions differ with the catalyst composition and the temperature of operation Typically, a catalyst has a temperature range within which it is effective and outside that range the conversion of nitrogen oxides is minimal. At the same time it is still necessary to remove the reducing agents, such as residual hydrocarbons, hydrogen, and carbon monoxide. Generally, workers in the field have suggested using more than one catalyst, for example, a catalyst to convert nitrogen oxides followed by an oxidation or three-way catalyst. Based on the results of our experiments we believe that certain catalysts may be capable of reducing nitrogen oxides within a particular temperature range but still remain very effective for oxidizing the reducing agents i.e., hydrocarbons and carbon monoxide, at other temperatures. Thus, it appears that providing for both the reduction of nitrogen oxides and the oxidation of the reducing agents involves not only selection of the proper catalysts but the proper combination of catalysts and their positioning in order to achieve the desired reduction of nitrogen oxides throughout the range of operating conditions of a lean burn engine.

Catalyst Supports

As shown in U.S. Ser. No. 07/990,216, a sequence of catalysts may be employed to cover the expected range of operating temperatures. The second and third catalysts of the preferred embodiment are alloyed noble metal catalysts of the present invention.

The second catalyst employs a new support, which is a barium stabilized delta alumina. It combines noble metals, particularly platinum and rhodium with cobalt in an alloyed form, which provide advantages relative to the comparable non-alloyed metals.

The support for the second catalyst is prepared by a sol-gel procedure which produces a very stable delta alumina and, although it contains a substantial amount of barium, appears to be solely alumina when examined by x-ray diffraction. This support designated $BaO$-$\delta$-$Al_2O_3$ is the subject of U.S. Ser. No. 07/994,838 incorporated herein by reference. In one example, the process for preparing the $BaO$-$\delta$-$Al_2O_3$ support employs the following steps.

(1) an aqueous barium acetate solution is prepared having a concentration suitable to provide about 1 to 12 wt. % Ba in the product;
(2) an aqueous boehmite sol having particles above about 150 Å (15 nm), preferably below 300 Å (30 nm) is stirred;
(3) the stirred sol of (2) is combined with the aqueous barium acetate solution of (1) and about 2 to 30 wt. % (preferably 10 to 25 wt. %) of polyethylene glycol (PEG) relative to the sum of PEG plus water to form a gel;
(4) the gel produced in step (3) is dried and then calcined in air to 1000° C.;
(5) the calcined gel of (4) is then treated at about 1000° to 1350° C., preferably about 1140° C., in an atmosphere containing about 0 to 30% steam, preferably about 100% steam, to convert the alumina into an essentially pure delta alumina.

This unique delta alumina is very stable and at temperatures up to 1350° C. has been found to retain the delta form with only a small amount of theta alumina and no alpha alumina being formed.

Another very stable catalyst support is alpha alumina. This material is not usually associated with highly active catalysts since it has a low surface area. Other forms of alumina having greater surface area, e.g., gamma, theta, and delta aluminas are usually used. However, for catalysts of the invention, alpha alumina is a useful support.

Other temperature-stable supports for use when thermal processing is used to form alloys include $\delta$-alumina, $\theta$-alumina, zirconia, titania, silicon carbide, and cordierite. When alloys are preformed and applied as colloidal solutions, the temperature-stable supports just mentioned may be used, but other less stable supports also may be chosen, including $\gamma$-alumina, crystalline boehmite, crystalline alumina silicates, non-crystalline silica-alumina, $\alpha$-$ZrPO_4)_2$, $NaZr_2(PO_4)_3$, and $(Na,H)Zr_2(PO_4)_3$.

Alloyed Noble Metals

The catalysts of the invention are alloys of platinum with other metals and include alloys of platinum with elements of Group 9, 10, and 11 of the TUPAC Periodic Table. Heretofore, it has been thought that alloying was detrimental to catalyst performance. See, for example, J. T. Kummer, J. Phys. Chem. 1986, 90, 4747–4752. Also, sintering of the noble metal crystallites has been seen in aged auto catalysts, suggesting that loss of activity is associated with sintering of the noble metals. Typical three-way catalysts used with engines operated with a stoichiometric air/fuel ratio are prepared by impregnating supports with noble metal solutions and heating to temperatures of about 450 to 700° C.

This process does and is intended to decompose the noble metal compounds and leave the metals as separate crystallites on the support. In the present catalysts, which are operated under oxidizing conditions, it has been found that alloying the noble metals provides catalysts for reduction of nitrogen oxides.

Alloying may be done by various methods. In order to prepare supported catalysts in which Pt is alloyed with elements such as Co, Ni, Cu, Pd, Rh, Ag, or Au by high temperature thermal methods, the atmosphere must be sufficiently reducing that the alloyed elements are stable as the elements, rather than being stable in a higher oxidation state stabilized by the support lattice. Hydrogen may be used to carry out the reduction. When used, it will be present in more than zero up to 100 vol %, preferably about 1 to 97 vol % in the treating atmosphere. One preferred method of alloying is to thermally treat the impregnated support in an inert atmosphere containing up to 30 vol % steam, preferably about 10 vol % steam, and more than zero and up to 100 vol % hydrogen, at temperatures of about 600° to 1200° C. selected to assure that any metal oxides are unstable with respect to the metals. Where the support is also produced by a process which uses a high temperature treatment to convert the alumina into a stable delta alumina, such as $BaO-\delta-Al_2aO_3$ as discussed above, it is feasible to use such a process to prepare alloys of platinum. Thermal treatment with hydrogen present is needed particularly when the metals to be alloyed with Pt are Ni, Co, and Cu. For the other metals named, hydrogen is considered optional.

Hydrogen is not required when the metals are Pd, Rh, Ag, and Au. Alloys of Pt with Rh, Pd, Ag or Au may be prepared by exposing the metals to temperatures of 600° to 1200° C. in an inert atmosphere, optionally containing 0–30 vol % $H_2O$.

Also, when hydrogen is absent oxygen may be introduced. The temperature and oxygen content of the gases are selected to provide the desired alloying. Alloys of Pt with Rh, Pd, and Au may be made in the presence of oxygen. In a specific example, Pt may be alloyed with Rh in an inert atmosphere which contains oxygen at temperatures below 1200° C. at which $Rh_2O_3$ is unstable with respect to Rh metal.

Generally, high temperature exposure to oxygen will increase the $NO_x$ reduction temperature window, as disclosed in co-pending U.S. Ser. No. 08/130,340. Thus, the time and concentration of oxygen should be selected with this effect in mind since the alloying of Pt and the other metals is desired, but the peak temperature at which $NO_x$ reduction occurs will also be affected.

Supported alloy catalysts may also be prepared by colloidal methods. In this case, thermal treatment is not required. This method involves preparing a solution of a platinum compound, salt, or complex, together with a reducible compound, such as a salt, or a complex of the metal with which one desires to alloy the platinum. To this solution a reducing agent is added to reduce the metal ions to the zero valent state. Preferred reducing agents include sodium borohydride, hydrazine, citric acid, formic acid, sodium formate and amine-borane complex. Preferably, the rate of reduction of the platinum compound and the compound of the metal with which one desires to alloy with the platinum should proceed at roughly similar rates. Generally, a protecting agent such as a polycarboxylic acid, or a polymer, or a surfactant, or a multiply-charged ion, is added. Preferred protecting agents include citric acid, polyvinyl pyrolidone, polyethylene glycol, and compounds capable of producing a sulfite anion in water. The role of this protecting agent is to adsorb onto small metal particles as they form, hindering their growth. By this method, stable or metastable colloidal alloys of platinum may be dispersed in solution. After formation of the alloy colloid, the support material may be added as an additional sol or in powdered or granular form. Alternatively, the alloy colloid may be permitted to contact a catalyst support which has previously been applied to an inert monolithic carrier. Adsorption of the alloy onto the support material, followed by recovery of the support, drying, and optional calcination, completes the catalyst preparation.

The noble metals (which are also transition metals) of Groups 8–10 of the IUPAC Periodic Table consist of Pt, Pd, Rh, Ru, Os, and Ir. Generally, only Pt, Pd, and Rh are used in automobile exhaust catalysts. Ru, Os, and Ir easily form volatile oxides and, for this reason, are generally considered to be impractical, even for use in stoichiometric three-way catalysts. Stoichiometric three-way catalysts operate under conditions that are considerably more reducing than conditions encountered under lean-burn or diesel conditions. Although Ru, Os, and Ir may be alloyed with platinum by methods outlined herein, these alloys are not considered to be practically useful for purification of lean-burn or diesel exhaust gases. In addition to Pd and Rh, the transition metals Co, Ni, Cu, Ag, and Au can form alloys with platinum that modify the performance of platinum for $NO_x$ reduction under lean-burn or diesel conditions. The atomic ratio of Pt to Rh and Pd may range from 1/2 to 1000/1, preferably between 5/1 to 1000/1, most preferably from 5/1 to 50/1. The ratio of Pt to Co, Ni, and Cu may range from 1/1 to 1000/1, preferably between 2/1 and 10/1. The ratio of Pt to Au may range from 15/1 to 1000/1, preferably 20/1 to 1000/1. The ratio of Pt to Ag may range from 1/10 to 1000/1. If disposed on a monolithic carrier, the Pt content may range from 0.3 g/L to 10 g/L, preferably 0.7 to 10 g/L, most preferably from 1 to 7 g/L. If disposed on a granular or spherical support, the platinum content may range from 0.15 wt. % to 7 wt. %, preferably between 0.33 wt. % and 5 wt. %, most preferably between 0.7 wt. % and 4 wt. %.

Optionally, base metals may be included in the catalysts as stabilizers or promoters provided they do not adversely affect the desired alloying of platinum and the other metals. If present, the base metals may range from about 0.01 to 50 g/L, most preferably 1 to 25 g/L based on a monolithic carrier. Addition of the base metals may be done by impregnation techniques familiar to those skilled in the art. Generally, these involve contacting the support with an aqueous solution of the metal (or metals) compound to be deposited and subsequently drying and heating the impregnated support to decompose the metal compounds.

The concentration of the metal compounds in solution will be adjusted to provide the amount of metals in the finished catalyst. The noble metal compounds may be those used in the past, such as halogenated compounds (e.g. chloro platinic acid, tetraamine platinum(II) chloride, rhodium chloride), nitrates (e.g. tetraamine platinum(II) nitrate, rhodium nitrate), acetates (e.g. rhodium acetate), sulfites, such as hydroxy disulfite platinum II acid, rhodium sulfite acid, and oxalates such as tetramethyl ammonium salts of bis-oxalato platinum(II) and tris-oxalato rhodium(III). Preferred noble metal compounds include rhodium nitrate, rhodium sulfite, rhodium oxalate, platinum oxalate and platinum sulfite.

The transition metals Co, Ni, Cu, Ag, and Au are preferably applied by impregnation of the support with an aqueous solution of soluble transition metal compounds. For gold, auric chloride or chloroauric acid may be used. For silver, silver nitrate, silver lactate, silver sulfite, or silver fluoride may be used. Compounds of cobalt, nickel, and copper may be chosen from the nitrate, acetate, lactate, citrate, or chloride. The choice of transition metal compounds will be determined by their kinetic ability to alloy with platinum.

EXAMPLE 1

250 mL of a boehmite sol (VISTA Chemical Dispal 11N7-12) was placed in a 4000 mL beaker. 15.82 g barium acetate was-dissolved in 10.3 mL of deionized water. The boehmite sol was stirred and the barium acetate solution along with 40.5 g of polyethylene glycol (ave. m.w. 400, Sigma PEG3265) were added simultaneously, producing a gel. The gel was transferred to an evaporating dish and dried in an oven at 120° C. The dried gel was then calcined at 1000° C. for 6 hours. A pure $\delta$ alumina stabilized by barium which we name $BaO-\delta-Al_2O_3$, was the result, with no evidence of separate barium-containing phases.

9.45 g of platinum sulfite acid solution (2.55 wt. % Pt), 2.44 g of rhodium nitrate solution (0.50 wt. % Rh), and 0.036 g of cobalt (II) nitrate hexahydrate were dissolved in 170 g of deionized water. The solution was brought into contact with 18 g of the $BaO-\delta-Al_2O_3$ support prepared above. The resulting impregnated support was dried at 100° C. for 3 hours and then calcined at 600° C. for 6 hours. The calcined catalyst was hydrothermally treated at a temperature of about 1140° C. for 6 hours in an atmosphere of nitrogen containing about 10% steam to alloy the noble metals. This Pt, Rh, $Co/BaO-\delta-Al2O_3$ catalyst contained 1.32 wt. % Pt, 0.067 wt. % Rh, and 0.04 wt. % Co. A similar $Pt/BaO-\delta-Al_2O_3$ catalyst was prepared in the same manner except that the Rh and Co were omitted.

EXAMPLE 2

A. 15.8 g of platinum sulfite acid solution (1.71 wt. % Pt) and 2.68 g of rhodium nitrate solution (0.50 wt. % Rh) were dissolved in 45 g of deionized water. The solution was brought into contact with 20 g of $\alpha$-alumina made by calcining at 1350° C. for 9 hours a commercial $\gamma$-alumina supplied by UOP. The resulting impregnated support was dried at 100° C. for 3 hours. The dried catalyst was hydrothermally treated at a temperature of about 1194° C. for 6 hours in an atmosphere of nitrogen containing about 100% steam to alloy the noble metals. This $Pt,Rh/\alpha-Al_2O_3$ catalyst contains 1.32 wt. % Pt and 0.067 wt. % Rh.

B. The preparation described above (A) was repeated except that 0.034 g of cobalt acetate tetrahydrate was dissolved in the platinum-rhodium solution so that the resulting catalyst contained cobalt in addition to the precious metals. This $Pt,Rh, Co/\alpha-Al_2O_3$ catalyst contained 1.36 wt. % Pt, 0.067 wt. % Rh, and 0.040 wt. % Co.

EXAMPLE 3

The four catalysts of Examples 1, 2A, and 2B were tested by exposure to a synthetic exhaust gas modeling emissions from a gasoline fueled lean-burn engine operating with an air-fuel ratio of about 18 which contained 1200 ppmv $NO_x$, 3000 ppmv CO, 1000 ppmv $H_2$, 1600 ppmv propene, 20 ppmv $SO_2$, 10 vol. % steam, 10 wt. % $CO_2$, and 3.2 vol. % $O_2$, remainder nitrogen. The chemical equivalence ratio, expressed as the ratio of oxidizing chemical equivalents to reducing chemical equivalents is 3.54. The temperature was gradually increased up to a maximum of 800° C. (rise 1) and then reduced to 50° C. and repeated (rise 2). The performance of the catalysts is shown in FIG. 1 for rise 1. It can be seen that each of the four catalysts exhibits an onset temperature for $NO_x$ reduction, a temperature of maximum $NO_x$ reduction, and a temperature above which $NO_x$ reduction does not occur. This contrasts with the performance of these same catalysts for oxidation of CO and hydrocarbons. Once a sufficient minimum temperature is attained, CO and hydrocarbon conversions increase with temperature to high, nearly quantitative, levels which do not decline substantially as temperature is increased to 800° C. The $Pt,Rh,Co/BaO-\delta-Al_2O_3$ catalyst is considerably more effective than the $Pt/BaO-\delta-Al_2O_3$ catalyst; this improvement is attributed to an alloyed nature of the Pt,Rh,Co catalyst. The modest improvement of the $Pt,Rh,Co/\alpha-Al_2O_3$ compared to the $Pt,Rh/\alpha-Al_2O_3$ is attributed to incorporation of Co into the Pt,Rh alloyed crystallites.

EXAMPLE 4

Figure 2:
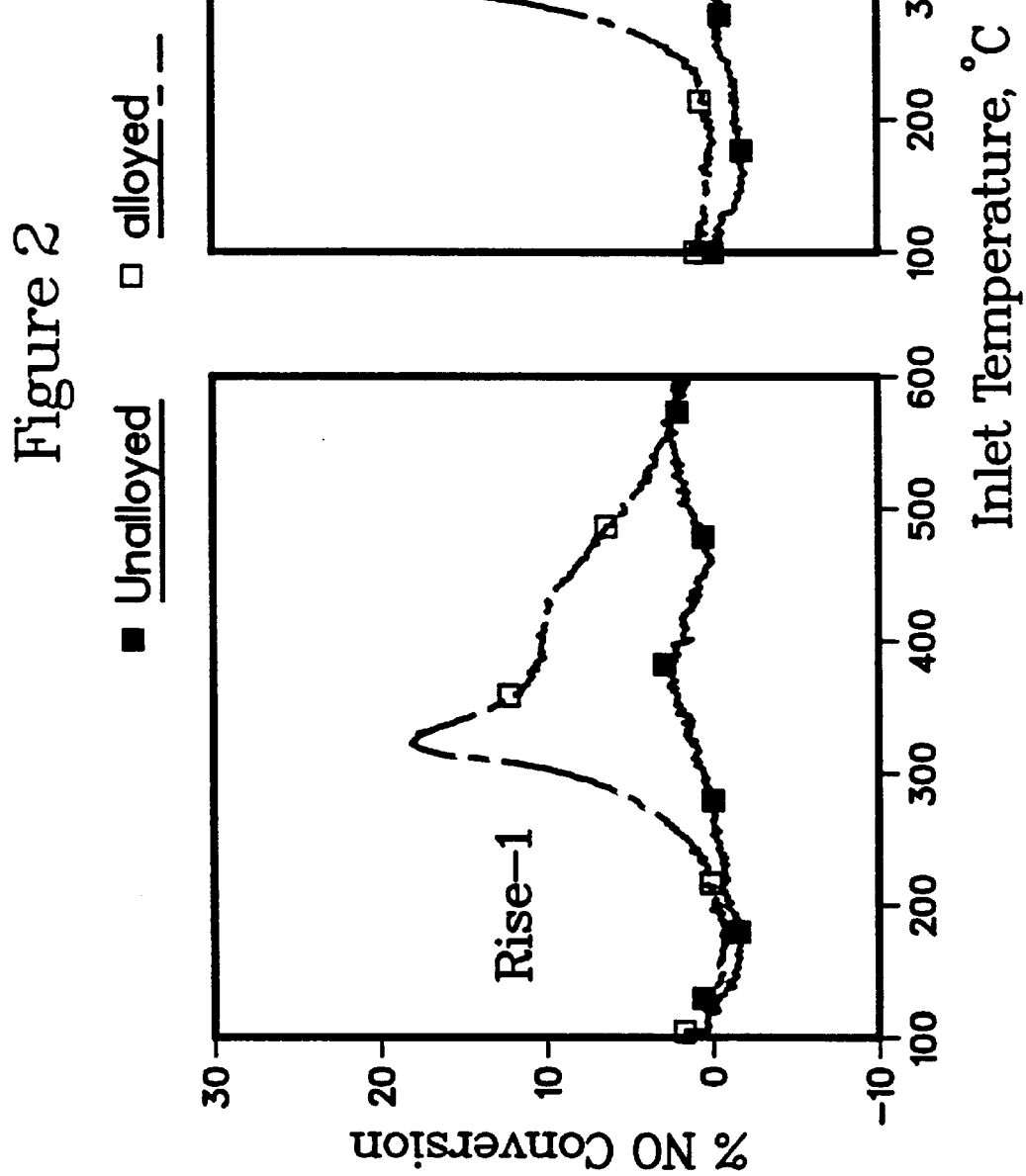
FIG. 2 is a plot of NO conversion versus temperature comparing the alloyed and unalloyed catalysts of Example 4.

A catalyst was prepared by applying a solution of chloroplatinic acid and rhodium chloride to 20–40 mesh pellets of a $CeO_2—Al_2O_3$ (24 wt. % $CeO_2$), followed by evaporation and calcination in air at 600° C. Analysis revealed the Pt content to be 4340 ppm by weight and the Rh content to be 1340 ppm by weight. In this form, the catalyst is not alloyed. The Pt and Rh in the catalyst were alloyed by treatment at 1200° C. in flowing $N_2$ with 10% steam. The unalloyed and alloyed catalysts were tested using the gas composition and temperature program used in Example 3. FIG. 2 shows performance of these two catalysts both during rise 1 and rise 2. The alloyed catalyst exhibits superior NO reduction performance.

Figure 3:
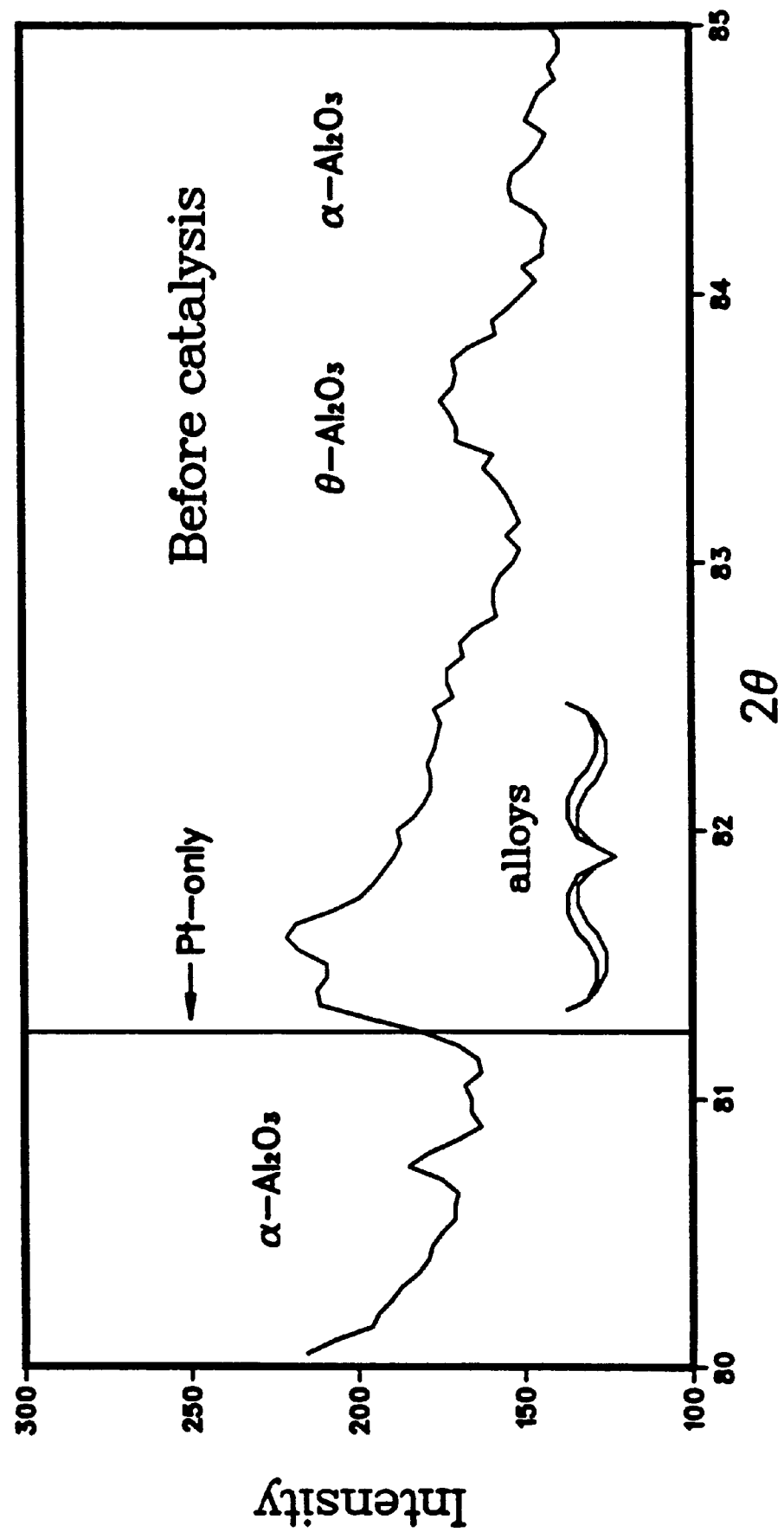
FIG. 3 shows the x-ray diffraction pattern of an alloyed Pt—Rh catalyst.

FIG. 3 shows the 311 reflection of the Pt,Rh catalyst as examined by X-ray diffraction using Cu-K$\alpha$ radiation. If substantial amounts of pure Pt crystallites were present, an intensity feature centered at 81.28° 2$\theta$ would occur; similarly if substantial amounts of pure Rh crystallites were present, an intensity feature centered at 84.39° 2$\theta$ would occur. Unfortunately, $\alpha-Al_2O_3$ also has a reflection centered at 84.37° 2$\theta$, rendering detection of any pure Rh impossible. Substantial diffraction intensity due to Pt,Rh alloys is apparent between about 81.3° 2$\theta$ and 83.0° 2$\theta$. A range of Pt,Rh compositions appears to occur, rendering any attempts to determine crystallite size by line shape analysis meaningless and, indeed, erroneous. FIGS. 2 and 3 demonstrate Pt,Rh alloys are capable of reducing $NO_x$ under highly oxidizing, lean-burn conditions.

EXAMPLE 5

A series of catalysts was prepared using a delta alumina manufactured by Condea, an aqueous solution of chloroplatinic acid, and an aqueous solution of cupric acetate monohydrate. After evaporation of the solution onto the alumina support, the material was calcined in air at 600° C. The Pt content was 1.32 wt. %, the Cu content 2000 ppm by weight. Portions of this catalyst were treated for six hours at the following conditions: 10% steam and 90% $N_2$ at 1140° C. (Treatment A), 10% steam and 90% $N_2$ at 1200° C. (Treatment B), and 10% steam, 85% $N_2$, and 5% $H_2$ at 1200° C. (Treatment C). The catalysts made by Treatments A, B, and C were examined by X-ray diffraction to determine the extent of alloying between Pt and Cu. The X-ray diffraction reflections for the metal occurred at angles greater than those for corresponding Pt-only reflections but lower than those expected for a stoichiometric alloy where all the copper is alloyed with all the platinum. The extent of alloying varied among the three treatments. We determined the apparent unit cell sizes for the three Pt,Cu catalysts; from this the mole fraction of Copper present in the Pt,Cu alloys can be determined. The following are the results of this analysis:

|             | Unit cell size | Mole fraction Cu |
|-------------|----------------|------------------|
| Treatment A | 3.854 Å        | 22.4%            |
| Treatment B | 3.850 Å        | 23.6%            |
| Treatment C | 3.844 Å        | 25.7%            |

Separate reflections due to pure Pt or pure Cu are not observed. It is believed that all the Pt is metallic while only a fraction of Cu occurs in metallic form alloyed with the Pt while the rest of the Cu is dispersed on the alumina as oxidized cupric species. The more reducing the treatment, the greater the fraction of copper present in the alloys produced.

In addition, an additional Pt,Cu catalyst containing only 700 ppm Cu was prepared using the same alumina provided by Condea, the same preparative method, and subjected to Treatment C. It was not subjected to X-ray diffraction analysis, but by analogy we expect a fraction of the copper is alloyed with the platinum.

For comparison, three Pt-only catalysts were prepared using the same alumina provided by Condea, the same preparative method, and subjected to Treatment B, Treatment C, or a Treatment D which involved 10% $H_2O$, 90% $N_2$ at 1100° C.

These catalysts were evaluated using a synthetic gas blend that models exhaust from a gasoline lean-burn engine operating at an Air-Fuel Ratio of 22. This gas contains 1000 ppmv CO, 330 ppmv $H_2$, 3300 ppmv propene, 700 ppmv NO, 7.5 vol. % $O_2$, 10 vol. % $CO_2$, 10 vol. % $H_2O$, and balance $N_2$; the flow rate was 5 liters/minute. The chemical equivalence ratio of this gas mixture is 5.34. The reactor inlet temperature was increased from 150° C. to 800° C. at 5° C./minute. $NO_x$ conversion commences at temperatures near those where propene conversion commences. In all cases, once $NO_x$ conversion commences, it increases monotonically with increasing temperature to a temperature of maximum $NO_x$ conversion; above this temperature, $NO_x$ conversion decreases monotonically. Performance may be compared by noting the maximum NO conversion level, the temperature of maximum $NO_x$ conversion, and by comparing relative total amounts of NO reduced. The total amount of NO reduced may be determined by integrating the observed time dependence of $NO_x$ conversion with respect to time. We define the integral amount of NO reduced by the Pt,Cu catalysts containing 2000 ppm Cu and subjected to Treatment C as 100. Performance of the Pt,Cu and Pt-only catalysts is summarized immediately below.

| Amount of Cu | Treatment | Max. NO Conv. | Temp. of Max. NO Conv. | Integral NO |
|--------------|-----------|---------------|------------------------|-------------|
| 2000 ppm     | C         | 48%           | 219° C.                | 100         |
| 700 ppm      | C         | 40%           | 238° C.                | 99          |
| 2000 ppm     | B         | 13%           | 224° C.                | 47          |
| 2000 ppm     | A         | 18%           | 226° C.                | 54          |
| 0            | C         | 24%           | 297° C.                | 55          |
| 0            | B         | 24%           | 280° C.                | 63          |
| 0            | D         | 26%           | 268° C.                | 75          |

The results of the foregoing table demonstrate the Pt,Cu catalysts to possess properties different from those of the Pt-only catalysts. The Pt,Cu catalysts prepared with reduction at 1200° C. reduce the most NO of the Pt,Cu catalysts while among the Pt-only catalysts, the catalyst subjected to this treatment reduces the least amount of NO. Larger amounts of Cu results in maximum NO conversion at lower temperatures. The most alloyed catalyst reduces the most NO. Alloyed Pt,Cu catalysts reduce NO at temperatures lower than those of similarly prepared Pt-only catalysts.

The Pt,Cu catalyst with 2000 ppm Cu that was subjected to treatment C together with the Pt-only catalysts subjected to treatment C were tested using the synthetic gas blend of this example with the addition of 20 ppm $SO_2$. The results of these two tests are summarized below. The alloyed Pt,Cu catalyst reduces more NO than the Pt-only catalyst, and the temperature of maximum NO reduction is nearly 100° C. lower than that of the Pt-only catalyst.

|         | Max. NO Conv. | Temp. of Max. NO Conv. | Integral NO |
|---------|---------------|------------------------|-------------|
| Pt, Cu  | 31%           | 249° C.                | 73          |
| Pt-only | 17%           | 344° C.                | 33          |

Alloying Pt with Cu substantially changes the nature of catalytic NO reduction under lean-burn conditions compared to Pt alone. Typically, they are effective at lower temperatures than similar Pt-only catalysts. Although performance at lower temperatures is generally considered to be a benefit in catalysis, this is not necessarily the case for lean $NO_x$ catalysts. Since lean $NO_x$ catalysts exhibit $NO_x$ control over characteristic ranges of temperatures, and do not reduce $NO_x$ at lower or higher temperatures outside of their characteristic range, lower temperature performance is not necessarily advantageous. Indeed, control of $NO_x$ emissions from lean-burn or diesel engines will be needed over a range of temperatures greater than the effective temperature range of any single catalyst considered in this invention. As such, sets of appropriately situated catalysts each possessing different temperature ranges over which they are effective will be required in order to provide adequate control of $NO_x$ emissions. The Integral NO values for these catalysts shows Pt catalysts alloyed with Cu can be more effective at reducing NO in the temperature window where they are effective under lean-burn conditions than Pt-only catalysts prepared in the same manner are in the temperature window where Pt-only are effective.

EXAMPLE 6

A similar series of Pt,Ag catalysts containing 1.32% Pt, 2000 ppm Ag catalysts was prepared using the same alumina support manufactured by Condea as used in Example 5 and a solution of chloroplatinic acid and silver nitrate. The solution was evaporated to deposit the metal complexes onto the alumina, the resulting material calcined at 600° C., and portions of the calcined material subjected to treatments A, B, and C to prepare three catalysts. The catalysts were examined by X-ray diffraction. Reflections due to Pt-only crystallites and due to Pt,Ag alloyed crystallites show that in contrast to the Pt,Cu catalysts, the alloyed crystallites in the three Pt,Ag catalysts have the same composition which is Ag-rich, rather than Pt-rich, containing, on average, 87% Ag. The intensity of the alloyed Pt,Ag reflections are considerably greater in the catalyst made with treatment C compared to those made by treatments A and B. This suggests that either the Pt,Ag crystallites are more highly sintered in the catalyst made by treatment C or that the mass fraction of Pt and Ag present in alloyed crystallites is greatest in the catalyst made by treatment C. The catalysts were evaluated by the method of Example 5 using the gas mixture that did not contain $SO_2$; results are summarized in the table immediately below.

| Treatment | Max. NO Conv. | Temp. of Max. NO Conv. | Integral NO |
|---|---|---|---|
| A | 20% | 318° C. | 47 |
| B | 23% | 272° C. | 46 |
| C | 43% | 261° C. | 95 |

The catalyst made with treatment C was also tested by the method of Example 5 using a gas mixture that contained 20 ppmv $SO_2$. The maximum NO conversion was 21%; the temperature of maximum NO conversion 270° C.; the integral NO value 70. The PtAg catalyst made by treatment C reduces considerably more NO than either the other Pt,Ag catalysts or the Pt-only catalysts of Example 5. We attribute the superior performance of the Pt,Ag catalyst made with treatment C to the probability that the alloyed crystallites dominate catalytic performance. The temperature range in which the Pt,Ag catalysts are effective varies considerably more than analogous Pt-only catalysts. The more forcing the alloying condition, the lower the range of effective temperatures for NO reduction. In contrast, the more forcing the treatment condition for the Pt-only catalysts, the higher the range of effective temperatures for NO reduction. As was the case for the Pt,Cu catalysts, alloying Pt with Ag modifies considerably the performance of the resulting catalyst for NO reduction under lean-burn conditions.

EXAMPLE 7

A series of Pt,Rh alloyed catalysts was prepared supported on alpha alumina. 55.57 grams Pt sulfite solution containing 2.55 wt. % Pt and 54.33 g Rh nitrate solution containing 0.50 wt. % Rh were diluted with 307.75 grams deionized water. 140 grams $\alpha$-$Al_2O_3$ was added and the solution was evaporated onto the alumina over a course of three hours. The catalyst contains 1.0 wt. % Pt and 0.19 wt. % Rh. Portions of these catalysts were treated at about 1050° C. in atmospheres containing 10 vol. % steam and various amounts of oxygen; i.e., 0 vol. % $O_2$, 200 ppm $O_2$, 600 ppm $O_2$, 1800 ppm $O_2$, 4800 ppm $O_2$, or 21 vol. % $O_2$; the balance was $N_2$. These materials were examined by X-ray diffraction. The material treated with 10% steam, 0% $O_2$, and 90% $N_2$ contained a broad, apparently bimodal, distribution of alloyed crystallites, with maxima of diffraction intensity corresponding to crystallites that are relatively Pt-rich (3.9 atom % Rh) and relatively Rh-rich (30.7 atom % Rh). A stoichiometric alloy wherein all the Rh is alloyed with all the Pt would contain 26.3 atom % Rh. The catalysts treated with ° 2 partial pressures of 200 ppm or greater all contained unimodal distributions of Pt,Rh alloys. The average Rh content, as determined by X-ray diffraction analysis, of the alloyed crystalfites in these catalysts is summarized below.

| | |
|---|---|
| 200 ppm $O_2$ | 22.7 atom % Rh |
| 600 ppm $O_2$ | 23.2 atom % Rh |
| 1800 ppm $O_2$ | 23.6 atom % Rh |
| 4800 ppm $O_2$ | 24.5 atom % Rh |
| 21% $O_2$ | 20.6 atom % Rh |

For low partial pressures Of $O_2$, the extent of alloying increases with $O_2$ partial pressure, but the extent of alloying is lower when air, with 21% $O_2$, was used. The important point is that alloys were formed in all these samples. This is due, in part, to the fact that $Rh_2O_3$ decomposes in air at temperatures of about 1033° C., so Rh metal is favored at treatment temperatures. Transport of Pt and Rh via unstable, volatile oxides, may facilitate alloy formation.

These five catalysts were tested using the gas mixture and temperature program of Example 3. Each catalyst exhibited a temperature window or range of temperatures where NO was reduced. The maximum NO conversion was between 35–40% for each of these catalysts. The temperature of maximum NO conversion occurred between 200° C. and 325° C.; the greater the $O_2$, partial pressure during the treatment that formed the alloys, the higher the temperature of maximum NO conversion. At the 20% conversion level the temperature windows for NO conversion varied in width between about 50° C. to about 70° C.

EXAMPLE 8

Alloyed catalysts of the present invention may be made by application of colloidal alloys of platinum onto suitable support materials or onto sol precursors of suitable support materials. A series of Pt,Rh/$SiO_2$ materials were prepared since silica (specifically, Cab—O—Sil M5) is a structurally amorphous material that provides a highly favorable substrate for characterization by X-ray diffraction. Materials containing about 2.7 wt % Pt were prepared with a theoretical atomic % Pt relative to the sum of Pt and Rh varying between 57% and 90%. Solutions containing suitable amounts of chloroplatinic acid and rhodium chloride were prepared to which citric acid monohydrate was added. The mole ratio of citric acid to platinum was about 10; the role of the citric acid is to stabilize the Pt,Rh alloy colloid particles with respect to growth and precipitation. Then a stoichiometric excess of a sodium borohydride solution was rapidly added. Rapid reaction ensued, and the solution turned black, consistent with production of a colloidal metal. The silica was added and the solution evaporated to dryness. The resulting materials were examined by X-ray diffraction; the apparent Pt unit cell lattice constant determined, and the amount of Pt present in the crystallites determined. Results are summarized in the Table immediately below:

| Alloy Lattice Parameter (Å) | Theoretical Pt atomic % | Experimental Pt atomic % |
|---|---|---|
| 3.905 | 90 | 85 |
| 3.891 | 83 | 74 |
| 3.880 | 77 | 64 |
| 3.881 | 66 | 65 |
| 3.855 | 57 | 52 |

The results show that the colloidal material formed by the sodium borohydride reduction consists of alloyed particles of Pt and Rh. The reflections were broad, suggesting that a range of compositions may have occurred.

A similar preparation provides a material that is catalytically active for the desired reaction. A reducing solution was made by dissolving 5.6 g NaOH in 400 g deionized $H_2O$; 4.0 g $NaBH_4$ was added to this solution. A precious metal solution containing 0.28 mg Rh and 26 mg Pt and about 903 g deionized water was prepared in a 4 liter beaker; 40 g polyvinylpyrollidone (PVP) solution (1 g PVP/1 water) was added to this precious metal solution. The PVP serves to stabilize the metal colloids after they form, enhancing their stability with respect to growth and precipitation. The reducing solution was rapidly added to the precious metal solution with stirring; bubbles due to $H_2$ formation formed rapidly and provided evidence that the reduction proceeded. A second solution Pt,Rh colloid was prepared in an identical manner. These two batches of Pt,Rh colloid were allowed to sit overnight. The batches of Pt,Rh colloid were combined in a 4-liter beaker and 115.4 g of Vista DISPAL 11N$_7$-12 alumina sol was added. The precious metal adsorbed onto the alumina sol, which precipitated. After settling, the supernatant was decanted, the resulting solid recovered and dried at 500° C. for 6 hr in flowing N$_2$. The DISPAL solution contains colloidal boehmite, and the drying temperature was chosen to be sufficiently high to cause the boehmite to transform to γ-Al$_2$O$_3$. The alloyed catalyst contained about 0.7 wt. % Pt and about 0.035 wt. % Rh.

This catalyst was then tested using the gas mixture of Example 3. The Pt,Rh alloy colloid catalyst of the present example may be compared with the Pt,Rh,Co/BaO-δ-Al$_2$O$_3$ alloyed catalyst of Example 1. The Pt,Rh alloy colloid exhibits an onset of NO reduction at about 250–275° C. while the Pt,Rh,Co/BaO-δ-Al$_2$O$_3$ exhibits an onset of NO reduction at about 325–350° C. The two catalysts reduce substantially the same amount of NO over the temperature rise (to within about 1.3%) although the Pt,Rh,Co/BaO-δ-Al$_2$O$_3$ reduces NO over a temperature range of about 150° C. while the Pt,Rh colloid catalyst reduces NO over a temperature range of about 250–275° C.

I claim:

1. A process comprising
   a. Reacting, in a solvent, soluble platinum compounds and soluble compounds of at least one metallic element selected from the group consisting of cobalt, nickel, copper, rhodium, palladium, silver and gold with a reducing agent capable of producing a colloidal suspension of alloy particles comprising platinum and said metallic element, said reaction also being carried out in the presence of a protecting agent selected from the group consisting of citric acid, polyvinyl pyrolidone, polyethylene glycol, and a compound capable of producing a sulfite anion in the solvent;
   b. Contacting said colloidal suspension of (a) with a support material that is a sol to form a catalytic composition comprising a support material having absorbed therein the alloy particles; and
   c. Drying and optionally calcining said catalytic composition of (b).

2. A catalytic composition comprising a colloidal suspension of alloy particles comprising platinum and at least one metallic element selected from the group consisting of cobalt, nickel, copper, rhodium, palladium, silver and gold and a support material sol, said catalytic composition being made by the process of claim 1.

3. A catalyst comprising a catalytically active material dispersed substantially uniformly on a refractory oxide inert substrate wherein the catalytically active material comprises a support and alloy particles, where the particles comprise platinum and at least one metallic element selected from the group consisting of cobalt, nickel, copper, rhodium, palladium, silver and gold, and where the catalytically active material is formed by combining a support sol and a colloidal suspension of the alloy particles formed in the presence of a protecting agent selected from the group consisting of citric acid, polyvinyl pyrolidone, polyethylene glycol, and compounds that produce a sulfite anion in water.

4. The catalyst of claim 3, wherein the sol is an alumina sol.

* * * * *